US012597124B2

(12) United States Patent (10) Patent No.: US 12,597,124 B2
Ohnishi (45) Date of Patent: Apr. 7, 2026

(54) DEBRIS DETERMINATION METHOD

(71) Applicant: SHIN-ETSU HANDOTAI CO., LTD.,
Tokyo (JP)

(72) Inventor: Masato Ohnishi, Nishigo-mura (JP)

(73) Assignee: SHIN-ETSU HANDOTAI CO., LTD.,
Tokyo (JP)

( * ) Notice: Subject to any disclaimer, the term of this
patent is extended or adjusted under 35
U.S.C. 154(b) by 313 days.

(21) Appl. No.: 18/568,996

(22) PCT Filed: Jun. 16, 2022

(86) PCT No.: PCT/JP2022/024137
§ 371 (c)(1),
(2) Date: Dec. 11, 2023

(87) PCT Pub. No.: WO2023/286518
PCT Pub. Date: Jan. 19, 2023

(65) Prior Publication Data
US 2024/0281961 A1 Aug. 22, 2024

(30) Foreign Application Priority Data
Jul. 13, 2021 (JP) ................................. 2021-115753

(51) Int. Cl.
*G06T 7/00* (2017.01)
*G01N 21/88* (2006.01)
(Continued)

(52) U.S. Cl.
CPC ................ *G06T 7/001* (2013.01); *G06T 7/11*
(2017.01); *G06T 7/62* (2017.01);
(Continued)

(58) Field of Classification Search
None
See application file for complete search history.

(56) References Cited

U.S. PATENT DOCUMENTS 9,546,862 B2   1/2017  Chen et al.
2012/0141011 A1*  6/2012  Sakai ................. G01N 21/9501
382/149

(Continued)

FOREIGN PATENT DOCUMENTS

JP    H02-275343 A    11/1990
JP      2720193 B2 *   2/1998
(Continued)

OTHER PUBLICATIONS

Jul. 26, 2022 International Search Report issued in International
Patent Application No. PCT/JP2022/024137.
(Continued)

*Primary Examiner* — Amandeep Saini
*Assistant Examiner* — Emma Rose Goebel
(74) *Attorney, Agent, or Firm* — Oliif PLC

(57) ABSTRACT

A debris determination method of determining, from an
image obtained by an appearance inspection device, debris
that occurs around an HLM on a backside of a wafer,
including: replacing luminance data of the image with
matrix data; extracting an HLM-printed region; obtaining a
least-squares plane of luminance; obtaining normalized
matrix data by subtracting the least-squares plane from the
printed region; obtaining protrusion-side matrix data by
substituting 0 for matrix values less than 0; obtaining
recess-side matrix data by inverting the sign of the normal-
ized matrix data and substituting 0 for matrix values repre-
senting dots and noise; obtaining composite matrix data
from the protrusion- and recess-side matrix data; obtaining
low-pass matrix data by processing the composite matrix
data; and determining debris from the low-pass matrix data
with a predetermined threshold and obtaining an area ratio
of the debris to determine the presence or absence of debris
in the printed region.

17 Claims, 13 Drawing Sheets

(51) Int. Cl.

| | | |
|---|---|---|
| *G06T 7/11* | (2017.01) | |
| *G06T 7/62* | (2017.01) | |
| *G06V 20/00* | (2022.01) | |

(52) U.S. Cl.

CPC ............... *G06T 2207/20076* (2013.01); *G06T 2207/30148* (2013.01); *G06T 2207/30208* (2013.01); *G06T 2207/30242* (2013.01); *G06V 20/95* (2022.01); *G06V 2201/06* (2022.01)

(56) References Cited

U.S. PATENT DOCUMENTS

| | | | |
|---|---|---|---|
| 2016/0247286 A1* | 8/2016 | Mazurenko | G06T 7/73 |
| 2018/0328859 A1* | 11/2018 | Osada | G01N 21/57 |
| 2023/0251207 A1* | 8/2023 | Sugihara | G06T 1/00 |
| | | | 382/149 |
| 2024/0044806 A1* | 2/2024 | Kanai | G01N 21/94 |

FOREIGN PATENT DOCUMENTS

| | | | |
|---|---|---|---|
| JP | 2002-365236 A | | 12/2002 |
| JP | 3620470 B2 | * | 2/2005 |
| JP | 2007150174 A | * | 6/2007 |
| JP | 2017-053764 A | | 3/2017 |

OTHER PUBLICATIONS

Jan. 16, 2024 International Preliminary Report on Patentability issued in International Patent Application No. PCT/JP2022/024137.

Mar. 26, 2024 Office Action issued in Japanese Patent Application No. 2021-115753.

Oct. 17, 2025 Office Action issued in Taiwanese Patent Application No. 111123002.

* cited by examiner

[FIG. 1]
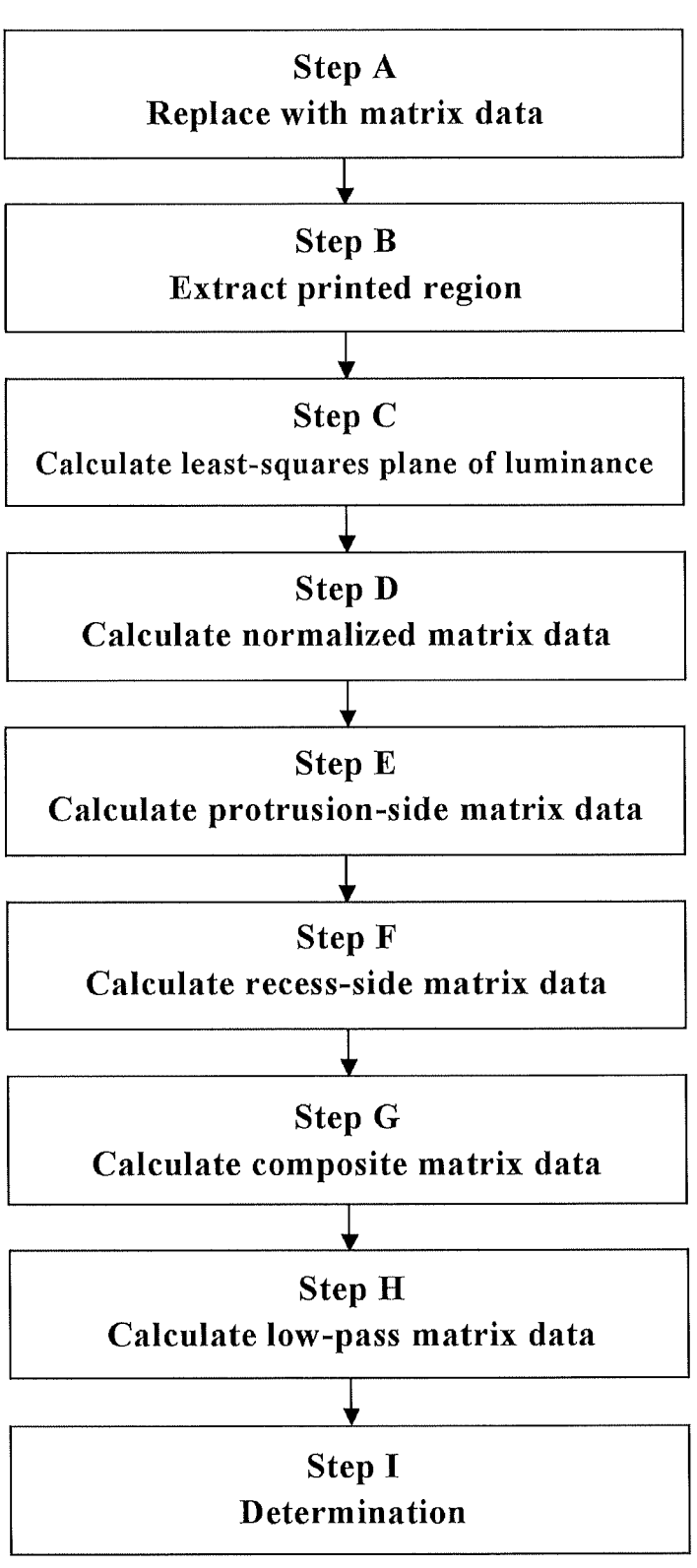

[FIG. 2]
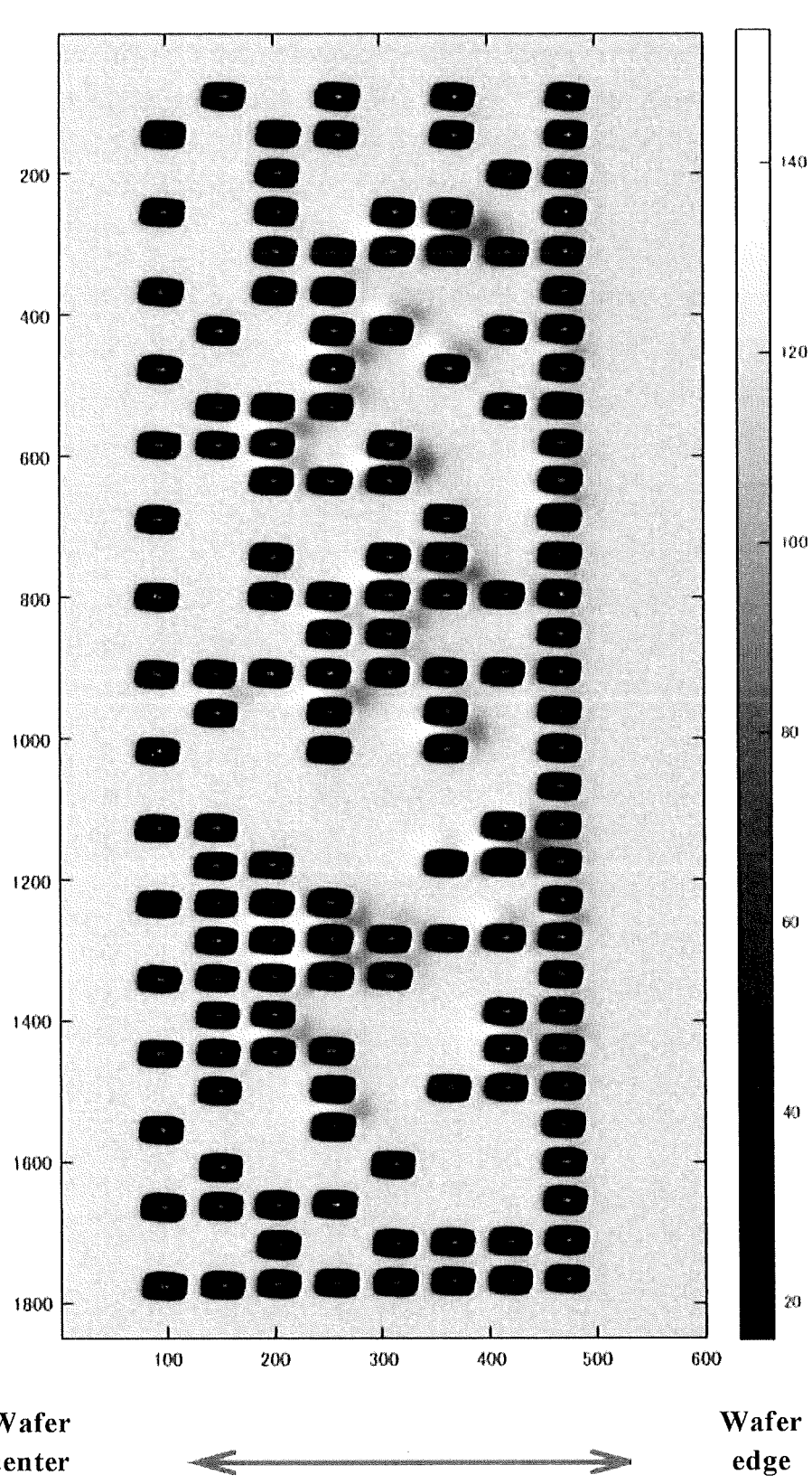
Wafer center ⟵⟶ Wafer edge

[FIG. 3]
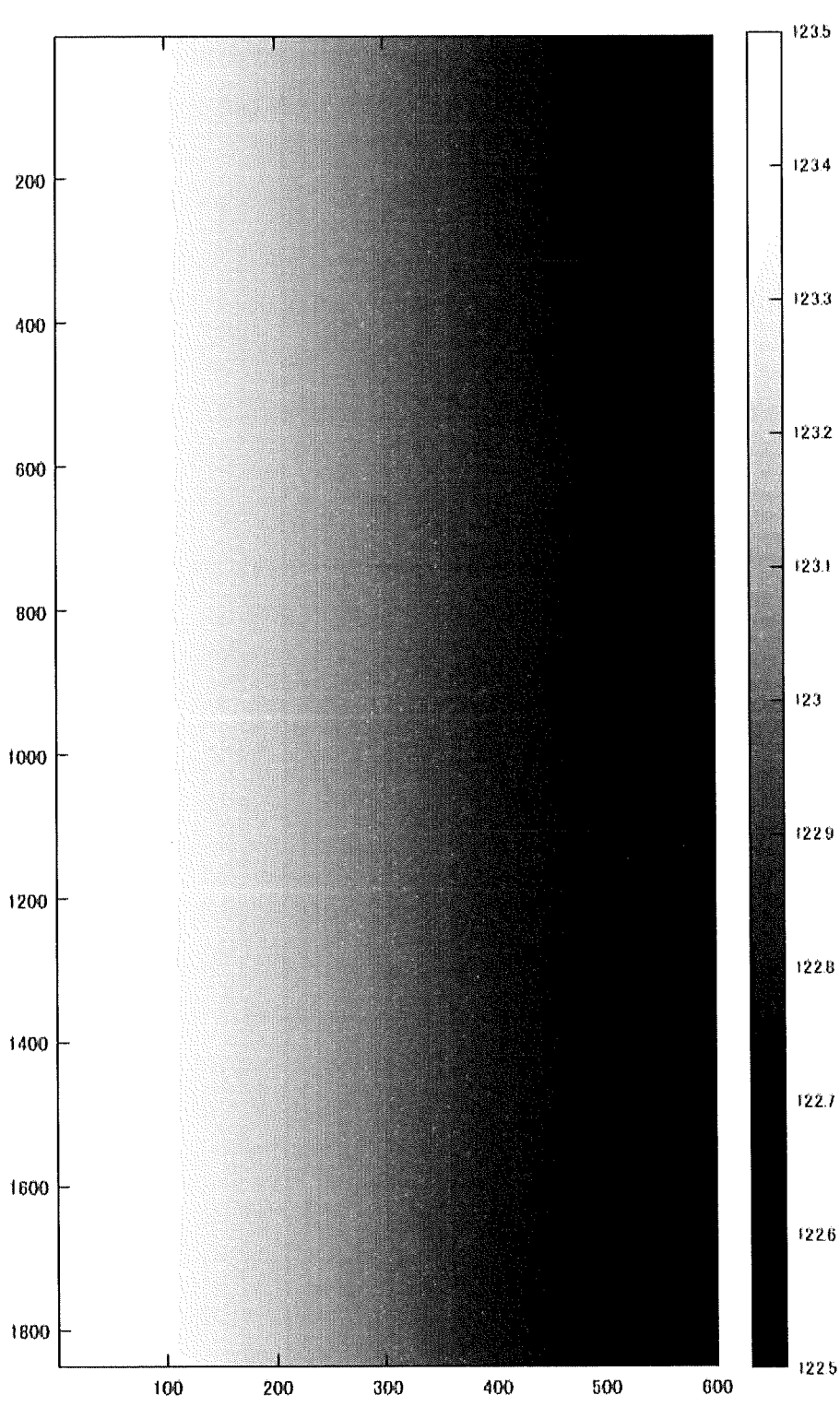

[FIG. 4]
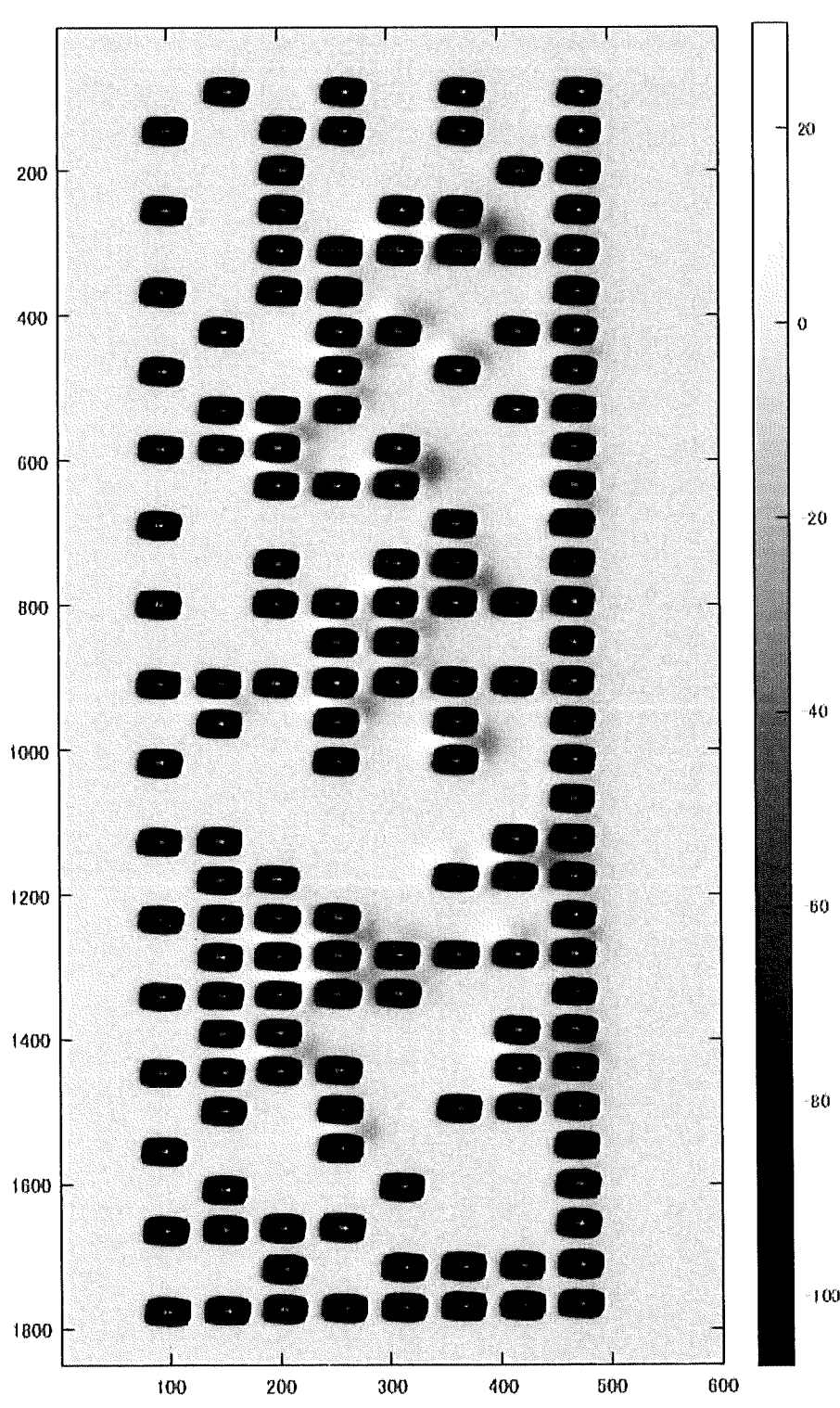

[FIG. 5]
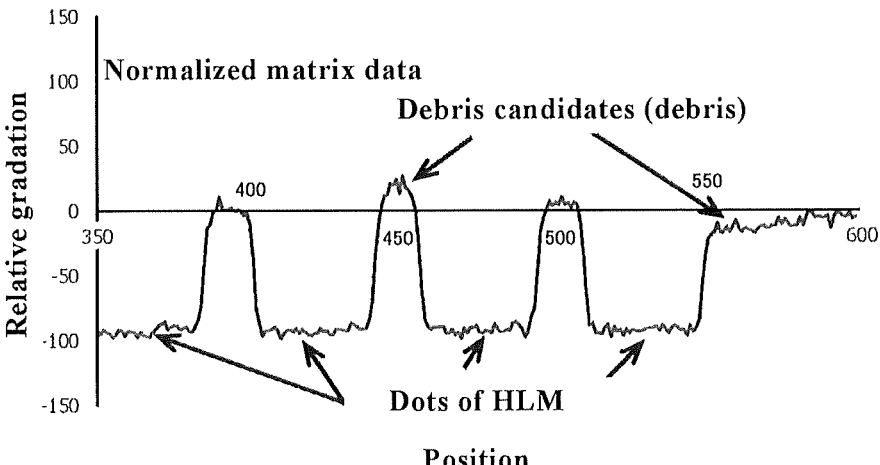
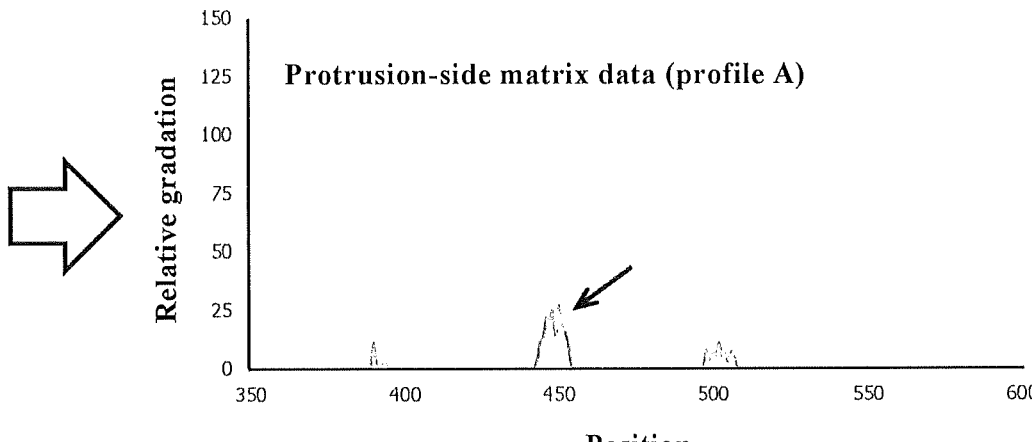

[FIG. 6]
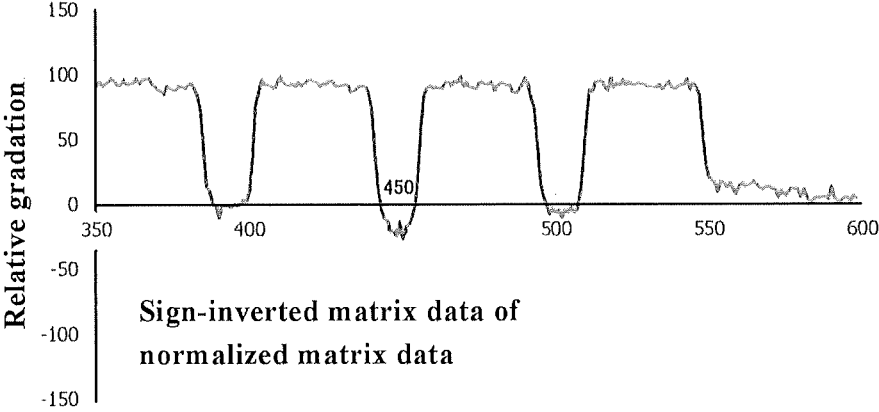
Sign-inverted matrix data of
normalized matrix data
Position
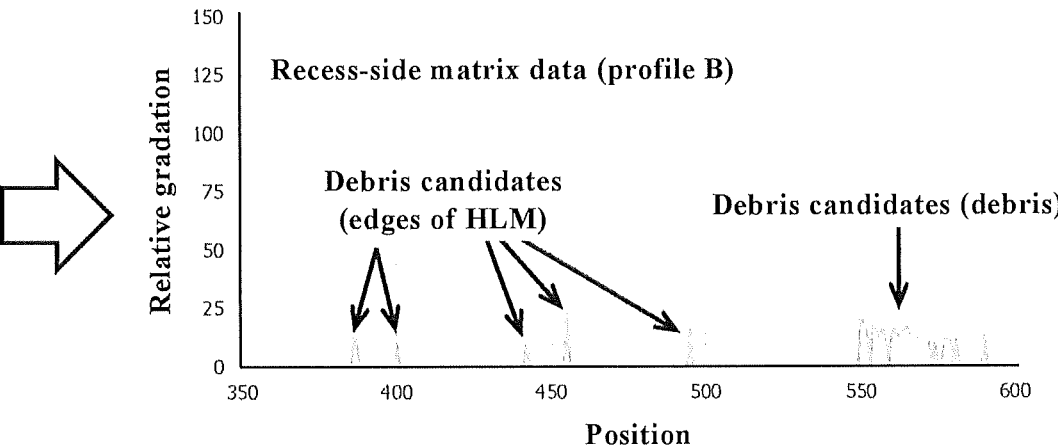
Recess-side matrix data (profile B)
Debris candidates
(edges of HLM)
Debris candidates (debris)
Position

[FIG. 7]
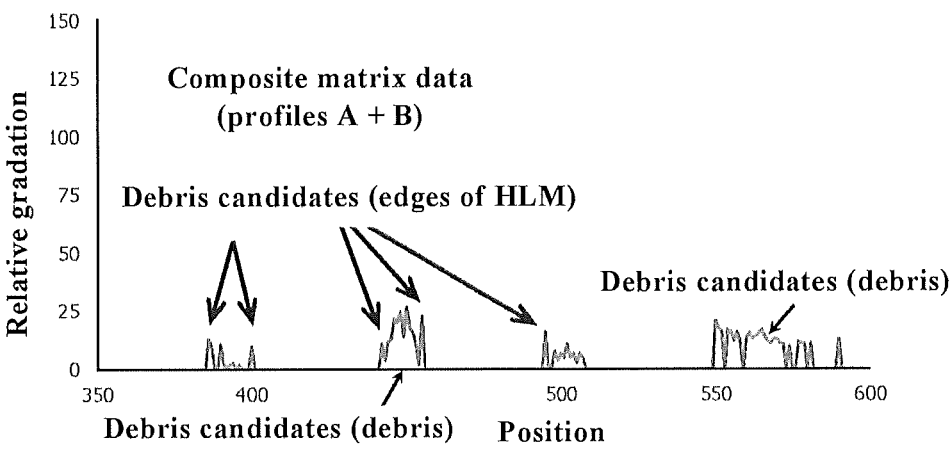
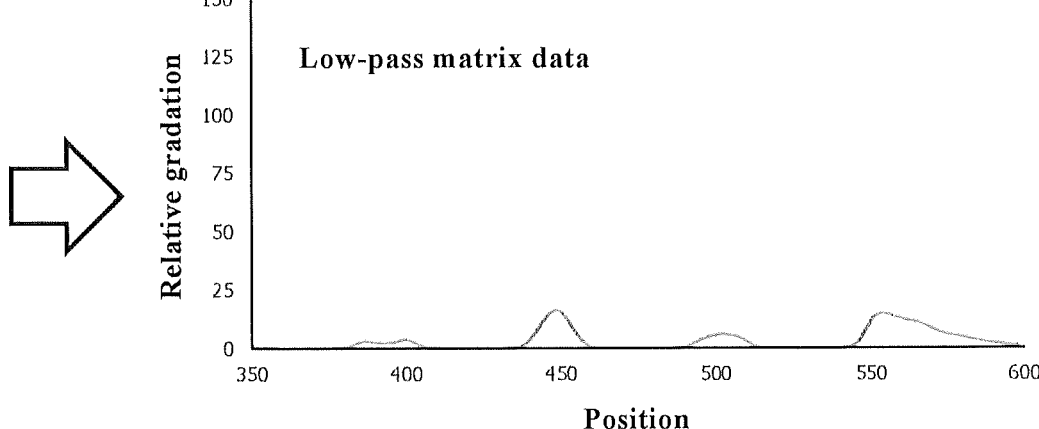

[FIG. 8]
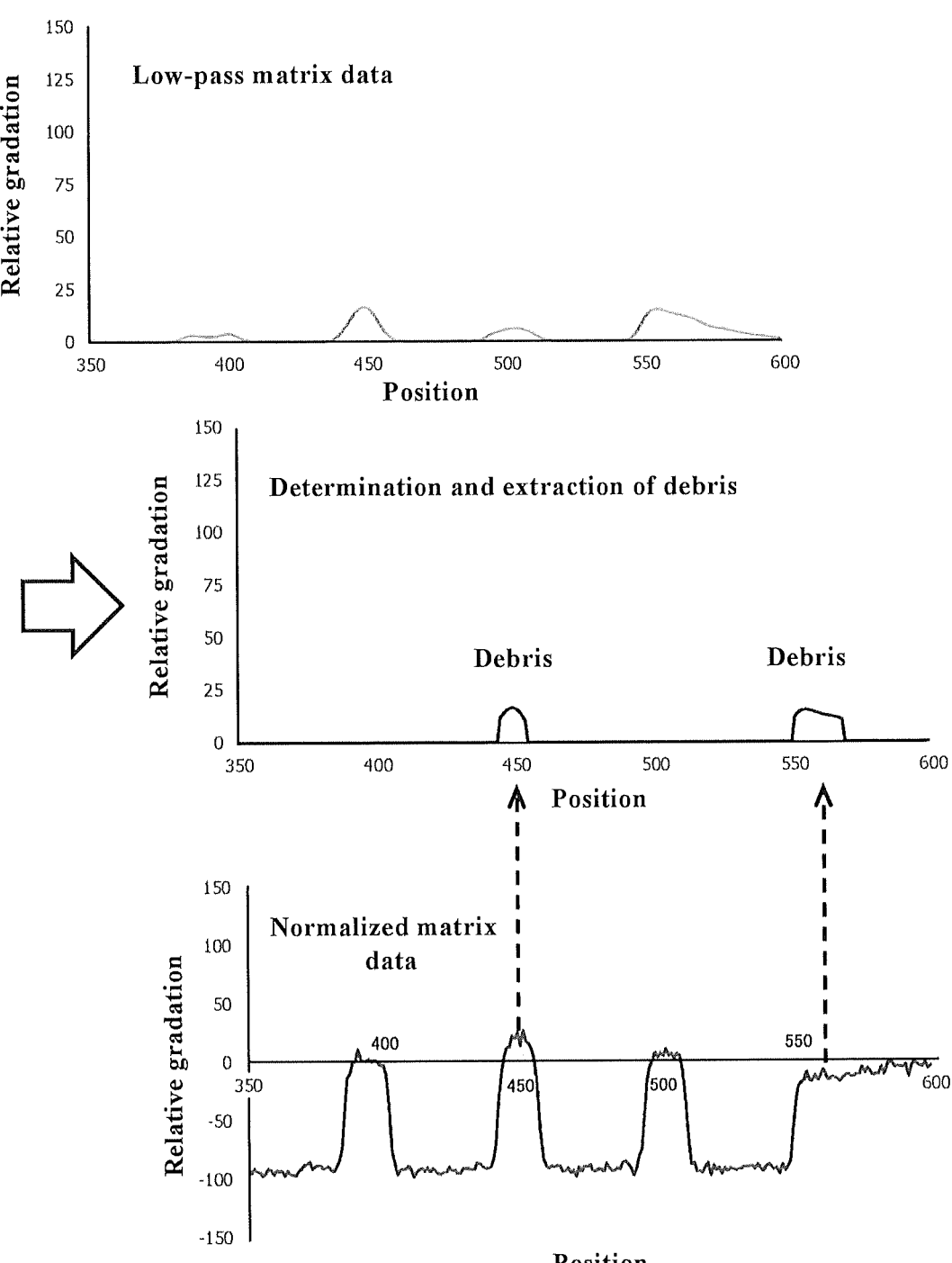

[FIG. 9]
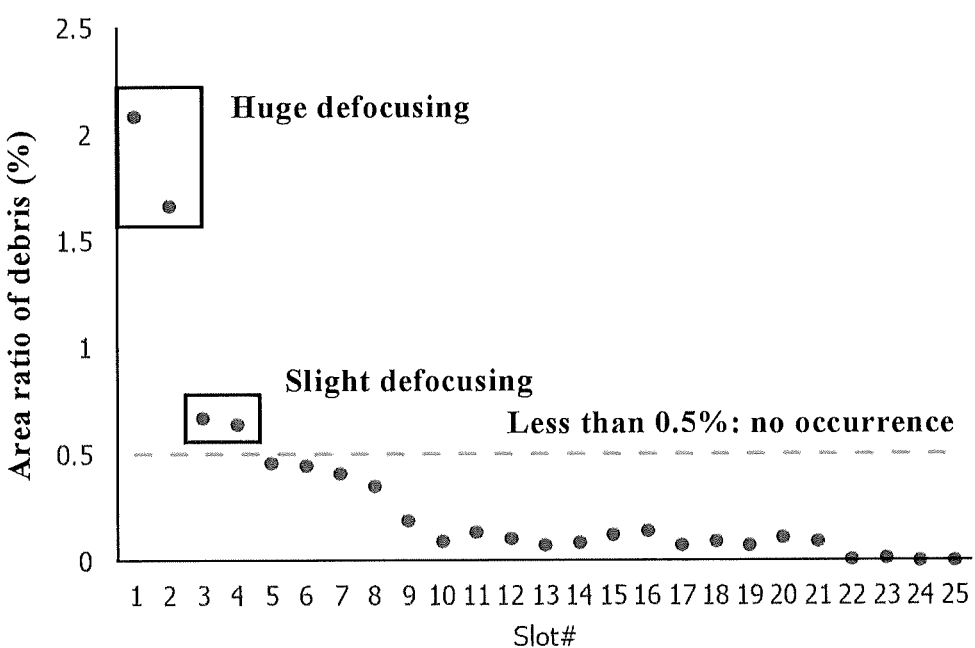

[FIG. 10]

[FIG. 11]
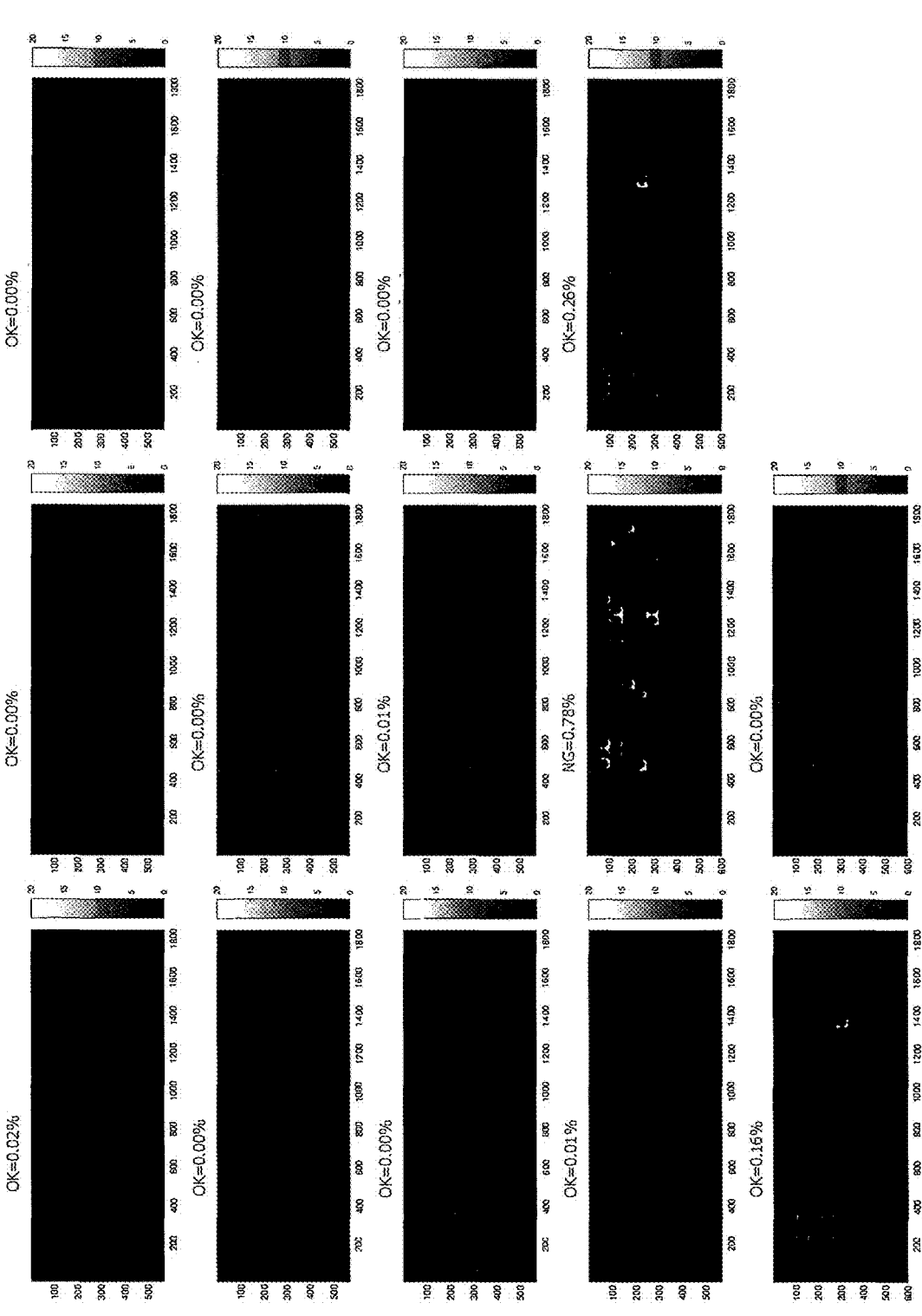

[FIG. 12]
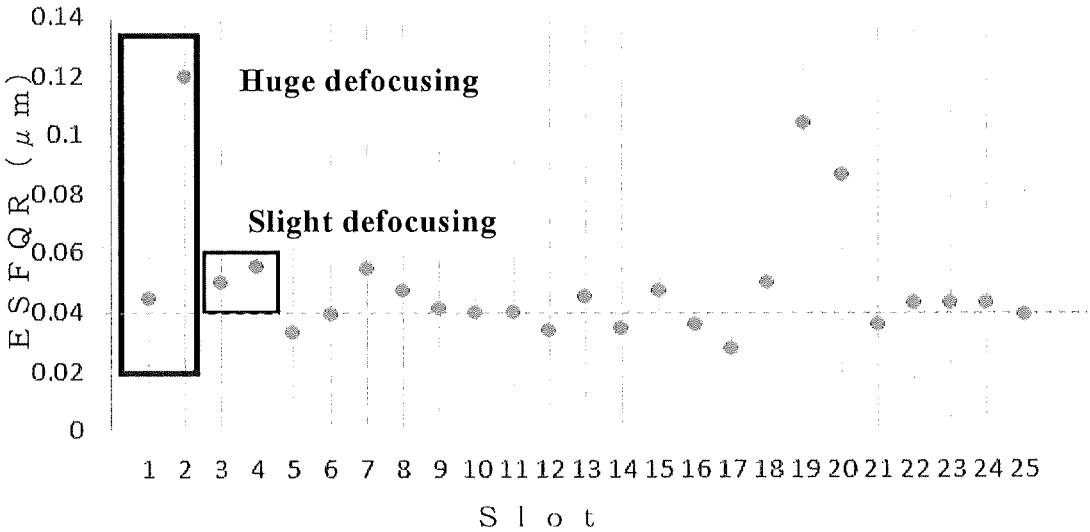
[FIG. 13]
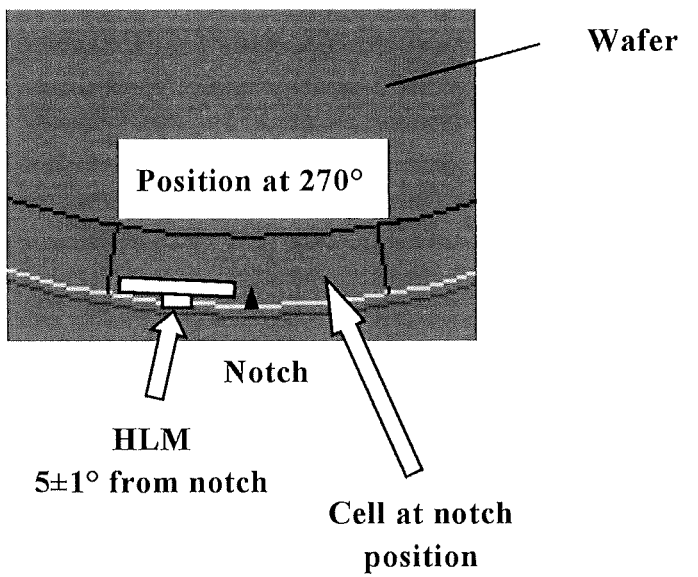

[FIG. 14]

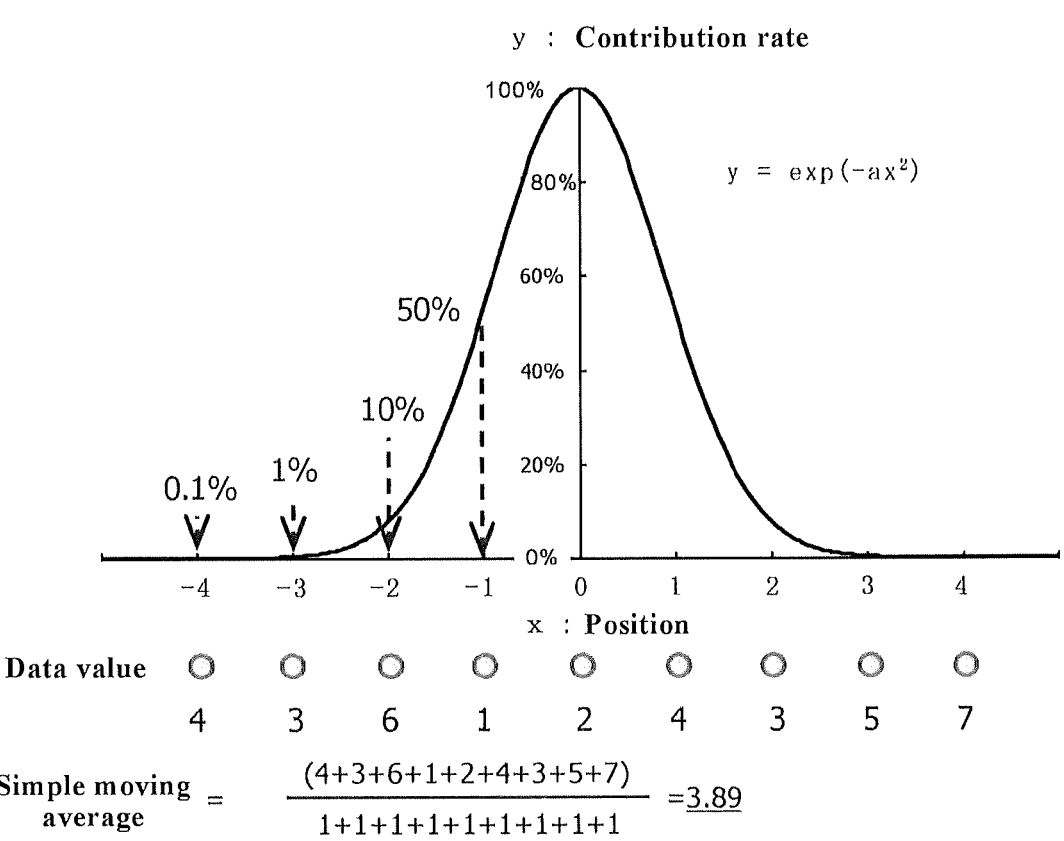

y : Contribution rate $y = \exp(-ax^2)$ x : Position

Data value   4   3   6   1   2   4   3   5   7

$$\text{Simple moving average} = \frac{(4+3+6+1+2+4+3+5+7)}{1+1+1+1+1+1+1+1+1} = \underline{3.89}$$

Typical value of center points: the value is almost double the raw data = 2

Weighted moving average $$= \frac{(4\times0.1\%+3\times1\%+6\times10\%+1\times50\%+2\times100\%+4\times50\%+3\times10\%+5\times1\%+7\times0.1\%)}{0.1\%+1\%+10\%+50\%+100\%+50\%+10\%+1\%+0.1\%}$$

$$= \underline{2.47}$$

Typical value of center points: the value is close to the raw data = 2

DEBRIS DETERMINATION METHOD

TECHNICAL FIELD

This present invention relates to a method of determining debris that occurs around a hard laser mark on a backside of a wafer using an image obtained by an appearance inspection device.

BACKGROUND ART

In order to identify individual silicon wafers, there is a process of printing an individual number in a flat portion on an edge of a backside of a wafer using solid-state laser (hard laser marking process). A hard laser mark is imprinted as characters by forming dots in an intermittent manner while melting the wafer itself with the high-power solid-state laser, so that silicon around the dot portion becomes amorphous, and the amorphous portion cannot be polished at the same polishing rate as the other monocrystalline portions during a subsequent polishing process. For this reason, a relatively gently-sloping bump is believed to be formed locally in the amorphous portion around the dots. This is called debris, and it has been noted that any interference of the debris with a stage for a device process will adversely affect device manufacturing. It is thus necessary to detect debris occurring in the laser mark portion.

In one conventional approach, shape measuring devices are used to identify debris in the hard laser mark portion as a shape abnormality due to thickness change. However, there have been cases where debris that cannot be detected by shape measuring devices poses a problem during the device manufacturing process. It is thus necessary to reliably detect such debris that cannot be detected by shape measuring devices.

As a conventional technique, a method of detecting surface irregularities or surface defects by image processing is disclosed.

For example, Patent Document 1 illustrates an example of image processing of a spherical concave recess and a spherical convex protrusion, and discloses that in a REV mode (reverse position defocusing), a protruded shape is brightly imaged (a recessed shape is darkly imaged) and in a FOW mode (forward position defocusing), a recessed shape is brightly imaged (a protruded shape is darkly imaged).

This technique is intended to detect depression-like defects caused by machining or crystallization, and is not intended to detect gentle bumps (debris).

When this method is used in an attempt to detect surface irregularities in the hard laser mark-printed region, only irregularities of the printed portion of the hard laser mark will be detected, and it will be impossible to detect gentle bumps (debris).

Patent Document 2 discloses a defect inspection method of photographing a surface of a to-be-inspected object with a differential interference microscope and counting the number of defects observed on the surface by image processing, where the defects are detected based on points whose luminance changes in the photographed image.

However, this technique is to measure the number of defects on the front surface, and cannot detect gentle bumps (debris) in the hard laser mark-printed region on the backside.

CITATION LIST

Patent Literature

Patent Document 1: JP 2017-053764 A
Patent Document 2: JP 2002-365236 A

SUMMARY OF INVENTION

Technical Problem

As described above, in one conventional approach, shape measuring devices are used to identify debris in the hard laser mark portion as a shape abnormality due to thickness change. However, there have been cases where debris that cannot be detected by shape measuring devices poses a problem during the device manufacturing process.

Hence, it is an object of the present invention to provide a debris determination method that can reliably detect such debris that cannot be detected by shape measuring devices and determine the presence or absence of debris.

Solution to Problem

To achieve the above object, the present invention provides a debris determination method of determining, using an image obtained by an appearance inspection device, debris that occurs around a hard laser mark on a backside of a wafer after the hard laser mark is formed on the backside or after the backside is polished after formation of the hard laser mark, comprising:

a step A of replacing luminance data of a grayscale image obtained by the appearance inspection device with matrix data;

a step B of extracting a hard laser mark-printed region including the hard laser mark from the matrix data;

a step C of obtaining a least-squares plane of luminance with reference to a portion without the hard laser mark within the extracted hard laser mark-printed region;

a step D of obtaining normalized matrix data by subtracting the least-squares plane of the luminance from the hard laser mark-printed region and removing a gradient of the luminance of the hard laser mark-printed region;

a step E of obtaining protrusion-side matrix data by substituting 0 for a matrix value less than 0 from the normalized matrix data;

a step F of obtaining recess-side matrix data by inverting a sign of the normalized matrix data and substituting 0 for a matrix value representing dots that constitute the hard laser mark and for a matrix value representing noise;

a step G of adding the protrusion-side matrix data and the recess-side matrix data to obtain composite matrix data;

a step H of obtaining low-pass matrix data by applying a two-dimensional moving average process to the composite matrix data; and a step I of determining, as the debris, data that indicate a matrix value exceeding a predetermined threshold from the low-pass matrix data, and obtaining an area ratio of the debris by counting a number of pieces of data of the debris and dividing the number by a number of pieces of data of the hard laser mark-printed region to determine presence or absence of the debris in the hard laser mark-printed region based on the area ratio of the debris.

Such an inventive debris determination method can reliably extract only debris that cannot be detected by shape measuring devices and allows for a more reliable determination of the presence or absence of debris than conventional methods.

Additionally, a quantitative evaluation is possible by obtaining an area ratio of debris.

In the step B, from bitmap data in the grayscale image composed of the matrix data, a region including data of row numbers and column numbers corresponding to positions of dots constituting the hard laser mark may be extracted as the hard laser mark-printed region.

In this manner, the hard laser mark printed-region can be extracted more easily and targeted for image processing.

In the step H, a process using a weighted matrix with a Gaussian distribution may be performed as the two-dimensional moving average process.

In this manner, low-pass matrix data having removed therefrom the short-period numerical fluctuations at peripheral edges of the hard laser mark dots, which are not completely removed in the composite matrix data, can be obtained more easily and appropriately.

In the step I, a relationship between an area ratio of the debris in the hard laser mark-printed region and quality defects caused by debris in a device manufacturing process may be obtained in advance, and a threshold (presence of debris) of an area ratio of debris at which the quality defects caused by debris occur may be set in advance, and when the area ratio of debris from the low-pass matrix data is at or above the threshold (presence of debris), it may be determined that debris is present.

When quality characteristic defects caused by debris in the device manufacturing process are known, making a determination in the above manner can be an extremely accurate and effective debris determination method.

In the step F, the matrix value representing the dots that constitute the hard laser mark may be set to 30 or more, and the matrix value representing the noise may be set to 10 or less, and in the step I, the predetermined threshold may be set to 10.

In this manner, only debris that cannot be detected by shape measuring devices can be extracted more reliably, allowing for a more reliable determination of the presence or absence of debris.

The present invention also provides a wafer having a hard laser mark on a backside thereof, comprising the hard laser mark-printed region that is determined to be free of the debris by the inventive debris determination method described above.

Such an inventive wafer is a qualified one that has been determined to be free of the debris that cannot be detected by shape measuring devices, so that it can be a good product that can reduce occurrence of problems caused by debris when it is later subjected to the device manufacturing process.

Advantageous Effects of Invention

The inventive debris determination method can reliably detect debris that cannot be detected by shape measuring devices and determine the presence or absence thereof. Additionally, a quantitative evaluation of debris is possible.

BRIEF DESCRIPTION OF DRAWINGS

FIG. 1 is a flowchart showing an example of the inventive debris determination method;

FIG. 2 is an image showing an example of a hard laser mark-printed region extracted in a step B;

FIG. 3 is an image showing an example of the least-squares plane of luminance (gradient of luminance) in the hard laser mark-printed region obtained in a step C;

FIG. 4 is an image showing an example of normalized matrix data obtained in a step D;

FIG. 5 is a graph showing an example of transition from the normalized matrix data to protrusion-side matrix data;

FIG. 6 is a graph showing an example of transition from matrix data obtained by inverting the sign of the normalized matrix data to recess-side matrix data;

FIG. 7 is a graph showing an example of transition from composite matrix data to low-pass matrix data;

FIG. 8 is a graph showing determination and extraction of debris from the low-pass matrix data based on a predetermined threshold;

FIG. 9 is a graph showing an example of relationship between an area ratio of the debris and the occurrence of defocusing in a device manufacturing process;

FIG. 10 is a set of images showing the matrix of portions in 15 wafers, out of 29 wafers for determination in Example, that were determined as debris in a step I;

FIG. 11 is a set of images showing the matrix of portions in the remaining 14 wafers, out of the 29 wafers for determination in Example, that were determined as debris in the step I;

FIG. 12 is a graph showing a relationship between an ESFQR and the occurrence of defocusing in a device manufacturing process in Comparative Example;

FIG. 13 is an explanatory diagram showing a cell containing the hard laser mark at the notch position; and FIG. 14 is an explanatory diagram showing an example of a Gaussian distribution in one dimension.

DESCRIPTION OF EMBODIMENTS

Hereinafter, embodiments of the present invention will be described with reference to the drawings. However, the present invention is not limited to the following description.

For the sake of brevity, the hard laser mark may be referred to hereinafter as an HLM, and the hard laser mark-printed region may be referred to hereinafter as a printed region.

The present invention is a method of determining debris occurring around an HLM on a backside of a wafer that has been formed with the HLM as an individual number or that has been further polished afterwards, using an image (grayscale image) obtained by an appearance inspection device. For example, any conventional, commercially available appearance inspection device can be used. One example is SIFTer300.

FIG. 1 shows an example of the inventive debris determination method. The method is roughly divided into the following steps: a step A: replacing with matrix data; a step B: extracting a printed region; a step C: calculating the least-squares plane of luminance; a step D: calculating normalized matrix data; a step E: calculating protrusion-side matrix data; a step F: calculating a recess-side matrix data;

a step G: calculating composite matrix data; a step H: calculating low-pass matrix data; and a step I: determination.

The steps will be detailed below.

<Step A: Replacing with Matrix Data>

This step is to replace luminance data of a grayscale image obtained by an appearance inspection device with matrix data.

An example of the grayscale image obtained by an appearance inspection device is a hard laser mark-printed position inspection image B_T7 (BMP format) in 8-bit grayscale (256 gradations). The HLM is printed at a specified position on the wafer, and the image captures an area around the position.

In the step A, the luminance data of this grayscale image obtained by the appearance inspection device capturing the vicinity of the printed region is represented by a matrix. This operation of the replacement with the matrix can be performed by a computer etc. For example, the matrix can be 7669×2048.

<Step B: Extracting Printed Region>

This step is to extract a printed region including the HLM from the matrix data.

For example, a convenient way is to extract, from the bitmap data in the above grayscale image converted to the matrix data, a region that contains data of the row and column numbers corresponding to positions of the dots constituting the HLM. It is preferable to cut out a region containing the portion where the HLM dots are printed, and particularly in a matrix range that is at least 20 rows and 20 columns in vertical and horizontal ranges larger than the portion. Since the HLM is printed in a region that is set according to a wafer standard as described above, it is possible to set a matrix range of the printed region. For example, from the matrix data obtained in the step A, the data of the row numbers 2800-4650 and the column numbers 1000-1600 can be extracted and used as the matrix of the printed region. An example of the extracted printed region is shown in FIG. 2.

By extracting the range containing the printed region in this manner, only the region where debris occurs can be targeted for image processing.

It is possible to set the extraction range in advance as described above and perform the extraction. Alternatively, for example, an operator can manually trim the region containing the HLM in the matrix data from the step A to extract the printed region.

Here, since the printed region is located on a peripheral portion of the wafer, the luminance is microscopically not constant even in portions without the HLM dots under the influence of the wafer peripheral shape. Hence, steps C and D described below are used to exclude the gradient of the luminance in the printed region, i.e., the influence of luminance change caused by the wafer peripheral shape. This can increase the accuracy of various thresholds of pixel luminance for detecting debris, which will be described below.

<Step C: Calculating Least-Squares Plane of Luminance>

This step is to obtain the least-squares plane of luminance with reference to the portions without the HLM in the extracted printed region.

In the printed region extracted in the above manner, it is preferable to obtain the least-squares plane of luminance with reference to four corners without the HLM dots. In other words, as shown in FIG. 2, the printed region is, for example, of a rectangular shape surrounded by two vertical sides and two horizontal sides, and there is no HLM in the vicinity of each side because the printed region has been extracted in the range that is at least 20 rows and 20 columns in vertical and horizontal ranges larger than the portion where the HLM is printed, as described above. Using the matrix values (luminance data) of the four points at the four corners of this rectangular shape, the least-squares plane (plane) of luminance in the printed region is obtained by a computer.

An example of the obtained least-squares plane of luminance is shown in FIG. 3. In FIG. 3, it can be seen that the luminance changes such that it decreases from the wafer center shown on the left side toward the wafer edge shown on the right side (a gradient of luminance can be seen).

<Step D: Calculating Normalized Matrix Data>

This step is to obtain normalized matrix data by subtracting the least-squares plane of luminance from the printed region and removing the gradient of luminance in the printed region.

In other words, the least-squares plane of luminance as shown in FIG. 3 is subtracted from the luminance data of the printed region as shown in FIG. 2. This can exclude the influence of luminance change caused by the wafer peripheral shape from each matrix value. The matrix data with matrix values normalized to the least-squares plane (the least-squares plane is set to zero) in this manner is defined as the normalized matrix data. An example of the normalized matrix data is shown in FIG. 4.

Then, in extracting debris from this normalized matrix data of the printed region, the HLM dots are excluded first. This is done in two stages, as in steps E and F described below.

<Step E: Calculating Protrusion-Side Matrix Data>

This step is to obtain protrusion-side matrix data by substituting 0 for matrix values less than 0 from the normalized matrix data.

In a first stage of the step of excluding the HLM dots, matrix values below 0 are first searched for from the normalized matrix data of the printed region. This is because the HLM dots are recessed deep holes and exhibit negative values in the normalized matrix data. Thus, 0 can be substituted for such matrix values below 0 (matrix values less than 0) in the printed region to exclude the HLM dots. The matrix data obtained here is defined as the protrusion-side matrix data.

FIG. 5 shows an example of the transition from the normalized matrix data to the protrusion-side matrix data (profile A). The example shown here is the transition of matrix values at the column numbers 350-600 at a certain row number. The vertical axis represents relative gradations of luminance, and the horizontal axis represents positions (column numbers).

In the normalized matrix data, as can be seen from the graph in this example, portions where the relative gradation is around −100 is the HLM dots (HLM recesses). On the other hand, portions other than these dots that are protruding or recessed relative to the reference is debris candidates.

By substituting 0 for the matrix values less than 0 as described above, the protrusion-side matrix data of only the protruding debris candidates can be obtained.

<Step F: Calculating Recess-Side Matrix Data>

This step is to invert the sign of the normalized matrix data and substitute 0 for matrix values representing the HLM dots and matrix values representing noise to obtain recess-side matrix data.

In this second stage, a matrix obtained by inverting the sign of matrix values in the normalized printed region is used. This point is explained below.

Due to installation limitations for the light source in capturing an image of the HLM portion, portions that appear dark (recessed portions) in the image need to be treated as debris. However, if, as in the first step, 0 is substituted for the matrix values below 0 in the normalized printed region, even the debris portions that appear recessed are excluded together with the HLM dots. Hence, in the present invention, the sign of matrix values in the normalized printed region is inverted to convert the matrix values expressed as negative values to positive values.

Then, by excluding the HLM dots and noise, only the debris candidates that appear recessed are extracted. In this case, the exclusion of the HLM dots and noise can be done using two thresholds. Matrix values of the HLM dots in the sign-inverted state are expressed as larger positive values than other portions. Also, debris candidates that appear recessed in the normalized printed region are expressed as positive values with relatively low height in the sign-inverted state. Thus, 0 is substituted for normalized and sign-inverted matrix values that are, for example, less than or equal to 10 and greater than or equal to 30. The matrix values of greater than or equal to 30 can be considered as representing the HLM dots, and the matrix values less than or equal to 10 can be considered as representing slightly sloped irregularities, i.e., noise.

The upper limit of the matrix value representing the HLM dots is not particularly limited, but can be 255, for example. The range of matrix values representing noise is also not particularly limited, but can be greater than 0 and less than or equal to 10, for example.

In this manner, appropriate thresholds for isolating the influence of the dots and noise from the sign-inverted version of the normalized matrix data are set to exclude them. Note that the above threshold for excluding the noise (less than or equal to a predetermined value) also causes the protruding debris candidates (portions that were positive before the sign inversion but have become negative due to the sign inversion) to be excluded.

The above thresholds of less than or equal to 10 and greater than or equal to 30 for excluding the noise and dots are not limited and can be determined for each case.

FIG. 6 shows an example of the transition from the matrix data obtained by inverting the sign of the normalized matrix data to the recess-side matrix data (profile B).

As can be seen from the graph in this example, in the sign-inverted matrix data, portions where the relative gradation is around 100 is the HLM dots (HLM recesses). On the other hand, portions with positive values other than the dots are the debris candidates that are originally recessed portions.

By substituting 0 for the matrix values e.g., greater than or equal to 30 and less than or equal to 10 as described above, the dots and noise can be excluded, and the recess-side matrix data of only the recessed debris candidates can be obtained. Through this step F, all the debris candidates can be aligned into a protruding shape. In practice, however, the debris candidates also contains the influence of peripheral edges of the HLM (also referred to simply as HLM edges).

<Step G: Calculating Composite Matrix Data>

This step is to add the protrusion-side matrix data and the recess-side matrix data to obtain composite matrix data.

By adding the protrusion-side matrix data from the step E and the recess-side matrix data from the step F in this manner, all the matrix values of the debris candidates become positive values.

8

<Step H: Calculating Low-Pass Matrix Data>

This step is to obtain low-pass matrix data by applying a two-dimensional moving average process to the composite matrix data.

As described above, the influence of the HLM dots and the influence of the noise are excluded from the recess-side matrix data in the step F with the two thresholds. However, the influence of the peripheral edges of the HLM dots is not completely excluded. Matrix values at the peripheral edges of the HLM dots fluctuate in a short distance (short period) in a spike-like manner, compared to matrix values at portions without the HLM.

Naturally, the influence of the peripheral edges of the dots that has not been completely removed is present in the debris candidates in the composite matrix data, which is obtained by adding that recess-side matrix data and the protrusion-side matrix data, and this makes it impossible to distinguish between actual debris and the peripheral edges of the dots based only on the magnitude of values.

Hence, a two-dimensional moving average is applied to the composite matrix data to remove the short-period numerical fluctuations at the peripheral edges of the HLM dots that have not been completely removed. Here, for example, a 20×20 matrix weighted with a Gaussian distribution can be used as the moving average. By convolving (performing a convolution on) the composite matrix data with a weighted matrix with a Gaussian distribution, low-pass matrix data can be obtained that has removed therefrom the short-period numerical fluctuations contained in the composite matrix data. In other words, short-period images originating from the peripheral edges of the HLM dots can be excluded from the debris candidates. The use of the Gaussian distribution allows for obtaining more convenient and appropriate matrix data.

Here, an example of the Gaussian distribution is explained with reference to FIG. 14. For the sake of brevity, a one-dimensional case is explained here. Consider a case where each of evenly arranged points contains a data value, and a data value at the center of certain nine points (position of 0 on the x axis in FIG. 14) of these points is to be obtained. Consider a distribution where the contribution rate is 1 (100%) at this center point and decreases as one moves away from the center. More specifically, it is a distribution where the contribution rate decreases as one moves away from the center according to the formula of $\exp(-ax^2)$ (the value of "a" can be determined as appropriate). In the example of FIG. 14, the contribution rate decreases to 50%, 10%, 1%, and 0.1% from 100% of the center, but these values are not limited. This provides a more adequate center data value than a center data value that is obtained from a simple moving average calculated based on the contribution rate of each of the nine points being 100%.

FIG. 7 shows an example of the transition from the composite matrix data (profile A+profile B) to the low-pass matrix data.

It can be seen that while the composite matrix data contains the influence of the short-period HLM edges in the debris candidates, the low-pass matrix data is free from any short-period numerical fluctuations.

<Step I: Determination>

This step is to determine, as debris, data that indicate matrix values exceeding a predetermined threshold from the low-pass matrix data, and obtain an area ratio of the debris by counting the number of pieces of data of the debris and diving it by the number of pieces of the printed region to thereby determine the presence or absence of debris in the printed region based on the area ratio of the debris.

This step will be described in more detail below.

Since the low-pass matrix data obtained in the step H consists of values greater than or equal to 0, matrix values that exceed a predetermined threshold, which is set to e.g., 10, are determined and extracted as debris. Naturally, this threshold can be determined as appropriate and is not limited to this value.

FIG. 8 shows the determination and extraction of debris from the low-pass matrix data based on the predetermined threshold. The normalized matrix data from the step D is also shown for comparison.

As can be seen, not only the protruding debris but also the recessed debris are successfully extracted. It can also be seen that only the debris is successfully extracted without being affected by the edges of the HLM dots.

Then, an area ratio of debris to the printed region is obtained by obtaining a ratio of the number of pieces of data of the matrix values exceeding the above threshold (the number of pieces of data determined as debris) to the number of pieces of data constituting the low-pass matrix data (the number of pieces of data of the printed region).

The presence or absence of debris in the printed region is determined from the area ratio of debris obtained in this manner, and a threshold for the presence/absence determination can be set, for example, as follows.

First, a relationship between an area ratio of the debris in the printed region and quality defects caused by debris in the device manufacturing process is obtained in advance. Further, from the relationship, a threshold (presence of debris) of an area ratio of debris at which quality defects caused by debris occur is set.

If the area ratio of debris obtained in the above manner for an actual wafer that is subject to determination is at or above the above threshold (presence of debris), it is determined that debris (debris that causes quality defects) is present.

FIG. 9 is a graph showing an example of relationship between an area ratio of the debris and the occurrence of defocusing in the device manufacturing process. For clarity, the sample levels (Slot) on the horizontal axis are sorted from high to low in terms of the area ratio of the debris.

In this case, defocusing defects start to occur when the area ratio of the debris is around 0.64-0.67% of the region to be processed (printed region). Thus, for example, the threshold (presence of debris) can be set to 0.5%, and if the area ratio is at or above 0.5%, it can be determined that debris is present.

Accordingly, for the matrix data of the debris actually determined and extracted in the step I, an area ratio of the debris is calculated from the ratio of [the number of pieces of matrix data determined as debris]/[the number of pieces of matrix data of the HLM-printed region], and an accurate determination of the presence or absence of debris can be made by determining whether the area ratio passes or fails the determination criterion of 0.5% of the region to be processed (printed region). In particular, it is possible to reliably screen wafers that will not have defocusing defects in the device manufacturing process.

By the way, the upper limit of the area ratio of the debris region cannot be determined as it depends on the number of pieces of matrix data determined as debris, but the maximum is 100% due to the above formula to calculate the area ratio of the debris region.

According to the present invention as described above, it is possible to reliably detect debris that cannot be detected by conventional inspection methods using shape measuring devices and make an accurate determination of the presence or absence of debris. Additionally, a quantitative evaluation is possible as the evaluation is performed by obtaining the area ratio of debris.

Additionally, since the qualified wafers with the printed region that has been determined to be free of debris by the inventive determination method have passed the accurate determination as described above, problems such as defocusing defects caused by debris can be prevented in the device manufacturing process.

EXAMPLE

The present invention will now be further detailed with reference to Example and Comparative Example, however the present invention is not limited to these examples.

EXAMPLE (25+29) wafers with a diameter of 300 mm and a crystal plane orientation of (110) were prepared. The imprinting location of the hard laser mark was at 5±1° from the notch on the backside of each wafer, and double side polishing was performed.

Of the total of 54 wafers, 25 wafers were used to investigate the relationship between the area ratio of the debris and the occurrence of defocusing in the device manufacturing process, and with reference to the relationship, the other 29 wafers were subject to determination of the presence or absence of debris that would affect the occurrence of defocusing.

Debris was detected on these wafers by image processing on 8-bit grayscale (256 gradations), BPM format, images obtained by an appearance inspection device (SIFTer 300).

<Step A: Replacing with Matrix Data>

The above grayscale image was replaced with the matrix data (7669 rows×2048 columns).

<Step B: Extracting Printed Region>

Out of the matrix data from the above grayscale image, data of the row numbers 2800-4650 and the column numbers 1000-1600 was cut out and used as matrix data of the hard laser mark-printed region.

<Step C: Calculating Least-Squares Plane of Luminance>

The least-squares plane of luminance was calculated from matrix values of the four points at the four corners without hard laser mark dots in the printed region cut out in the step B.

<Step D: Calculating Normalized Matrix Data>

The least-squares plane of luminance from the step C was subtracted from the matrix data of the hard laser mark-printed region to obtain the normalized matrix data.

<Step E: Calculating Protrusion-Side Matrix Data>

The value 0 was substituted for matrix values less than 0 to obtain the protrusion-side matrix data (debris candidates) from the normalized matrix data obtained in the step D.

<Step F: Calculating Recess-Side Matrix Data>

The normalized matrix data obtained in the step D was multiplied by −1 to invert the sign of matrix values of the normalized matrix data. This allows the portions that appear dark and recessed in the image to be recognized as protruding debris. Further, in order to exclude the influence of the hard laser mark dots, 0 was substituted for matrix values greater than or equal to the threshold of 30. In addition, in order to exclude the influence of relatively smaller irregularities than the debris caused by the wafer shape, which are unrelated to debris, 0 was substituted for matrix values less than or equal to the threshold of 10. Through the above process, the influence of the hard laser mark dots and the noise unrelated to debris was excluded from the matrix data obtained by the sign inversion. This resulted in the recess-side matrix data (debris candidates).

<Step G: Calculating Composite Matrix Data>

The protrusion-side matrix data obtained in the step E and the recess-side matrix data obtained in the step F were added. This causes both debris that appears protruding and debris that appears recessed in the image to have positive values. However, although the objects unrelated to debris were excluded from the recess-side matrix data using the two thresholds, it still contains the influence of the peripheral edges of the hard laser mark dots. Since the peripheral edges of the hard laser mark dots distinctively have shorter-period irregularities than debris, they can be removed by applying a low-pass filter in the next step.

<Step H: Calculating Low-Pass Matrix Data>

The composite matrix data obtained in the step G was subjected to a convolution operation (convolution) with a 20×20 matrix with a Gaussian-distribution to remove the short-period bumps on the peripheral edges of the hard laser mark dots.

<Step I: Determination>

In the low-pass matrix data obtained in the step H, data indicating the matrix values exceeding the threshold of 10 was determined as debris, and the number of pieces of such data was counted to calculate an area ratio (Area %) of debris based on the ratio relative to the number of pieces of data constituting the low-pass matrix data (hard laser mark-printed region).

An investigation on a relationship between the obtained area ratio of debris and the occurrence of defocusing in the device manufacturing process resulted in a graph that showed a similar relationship to that of FIG. 9. Regarding the area ratio of debris at which specific problems (defocusing) occur, 0.64-0.67% was recognized as being near the boundary of the defocusing occurrence, and 0.5% or more was defined as having debris. These are the results obtained from the 25 wafers for investigation.

Then, the 29 wafers for determination were subject to the determination according to the pass/fail criterion of 0.5% obtained from the graph of FIG. 9.

First, FIG. 10 shows in white the matrix of the portions determined as debris in the step I for 15 out of the 29 wafers. The remaining 14 wafers are shown in FIG. 11. The area ratio of debris varied from 0% to about 16%, as noted above each image.

Then, the wafers with the ratio of 0.5% or more were determined as having debris and failed (NG), while those with the ratio of less than 0.5% were determined as not having debris and passed (OK).

Following the actual device manufacturing process, an investigation was conducted on the occurrence of defocusing defects, and a match with the determination result was confirmed for each wafer. In other words, defocusing defects occurred in the wafers that were determined to be failed, while no problematic defocusing defects occurred in the wafers that were determined to be passed. Therefore, it can be seen that the inventive debris determination method can effectively determine the presence or absence of debris that would cause defocusing defects.

COMPARATIVE EXAMPLE

Results of shape measurement (ESFQR) of the hard laser mark-printed region using a commercially available shape measuring device (WaferSight, made by KLA-Tencor) were analyzed to see whether they could be separated based on the results of defocusing determination in the device process.

Similar wafers to the 25 wafers for investigation in Example were prepared.

Note that the ESFOR refers to a calculated range of positive and negative deviations from an intra-region least squares method for a rectangular region (cell). A generally rectangular region to be measured is surrounded by 10 mm from the peripheral edge in the diameter direction and an arc that is equivalent to 18° in the circumferential direction, and a cell positioned at a wafer center angle of 270° (cell at the notch position) is the region containing the hard laser mark. FIG. 13 shows the cell containing the hard laser mark at the notch position.

FIG. 12 shows an example of relationship between the ESFOR and the occurrence of defocusing in the device manufacturing process. The sequence of the sample levels on the horizontal axis is the same as that in Example.

The rectangular region at 270° subjected to the shape measurement corresponds to the position of the hard laser mark formation. However, it can be seen that it is impossible to determine the presence or absence of defocusing defects caused by debris in the device process based on the ESFOR values.

In other words, attempts to classify problematic wafers based on the thickness shape variation values (ESFOR) as a conventional debris abnormality screening method had the following outcomes. While some wafers that had the problem of defocusing in the device process exhibited high values, other wafers did not exhibit high values despite having huge defocusing. Conversely, some wafers with no problems exhibited high values. After all, the ESFOR cannot be used to screen the presence or absence of debris.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A debris determination method of determining, using an image obtained by an appearance inspection device, debris that occurs around a hard laser mark on a backside of a wafer after the hard laser mark is formed on the backside or after the backside is polished after formation of the hard laser mark, comprising:

a step A of replacing luminance data of a grayscale image obtained by the appearance inspection device with matrix data;

a step B of extracting a hard laser mark-printed region including the hard laser mark from the matrix data;

a step C of obtaining a least-squares plane of luminance with reference to a portion without the hard laser mark within the extracted hard laser mark-printed region;

a step D of obtaining normalized matrix data by subtracting the least-squares plane of the luminance from the hard laser mark-printed region and removing a gradient of the luminance of the hard laser mark-printed region;

a step E of obtaining protrusion-side matrix data by substituting 0 for a matrix value less than 0 from the normalized matrix data;

a step F of obtaining recess-side matrix data by inverting a sign of the normalized matrix data and substituting 0 for a matrix value representing dots that constitute the hard laser mark and for a matrix value representing noise;

a step G of adding the protrusion-side matrix data and the recess-side matrix data to obtain composite matrix data;

a step H of obtaining low-pass matrix data by applying a two-dimensional moving average process to the composite matrix data; and a step I of determining, as the debris, data that indicate a matrix value exceeding a predetermined threshold from the low-pass matrix data, and obtaining an area ratio of the debris by counting a number of pieces of data of the debris and dividing the number by a number of pieces of data of the hard laser mark-printed region to determine presence or absence of the debris in the hard laser mark-printed region based on the area ratio of the debris.

2. The debris determination method according to claim 1, wherein in the step B, from bitmap data in the grayscale image composed of the matrix data, a region including data of row numbers and column numbers corresponding to positions of dots constituting the hard laser mark is extracted as the hard laser mark-printed region.

3. The debris determination method according to claim 2, wherein in the step H, a process using a weighted matrix with a Gaussian distribution is performed as the two-dimensional moving average process.

4. The debris determination method according to claim 3, wherein in the step I, a relationship between an area ratio of the debris in the hard laser mark-printed region and quality defects caused by debris in a device manufacturing process is obtained in advance, and a threshold (presence of debris) of an area ratio of debris at which the quality defects caused by debris occur is set in advance, and when the area ratio of debris from the low-pass matrix data is at or above the threshold (presence of debris), it is determined that debris is present.

5. The debris determination method according to claim 4, wherein in the step F, the matrix value representing the dots that constitute the hard laser mark is set to 30 or more, and the matrix value representing the noise is set to 10 or less, and in the step I, the predetermined threshold is set to 10.

6. The debris determination method according to claim 3, wherein in the step F, the matrix value representing the dots that constitute the hard laser mark is set to 30 or more, and the matrix value representing the noise is set to 10 or less, and in the step I, the predetermined threshold is set to 10.

7. The debris determination method according to claim 2, wherein in the step I, a relationship between an area ratio of the debris in the hard laser mark-printed region and quality defects caused by debris in a device manufacturing process is obtained in advance, and a threshold (presence of debris) of an area ratio of debris at which the quality defects caused by debris occur is set in advance, and when the area ratio of debris from the low-pass matrix data is at or above the threshold (presence of debris), it is determined that debris is present.

8. The debris determination method according to claim 7, wherein in the step F, the matrix value representing the dots that constitute the hard laser mark is set to 30 or more, and the matrix value representing the noise is set to 10 or less, and in the step I, the predetermined threshold is set to 10.

9. The debris determination method according to claim 2, wherein in the step F, the matrix value representing the dots that constitute the hard laser mark is set to 30 or more, and the matrix value representing the noise is set to 10 or less, and in the step I, the predetermined threshold is set to 10.

10. The debris determination method according to claim 1, wherein in the step H, a process using a weighted matrix with a Gaussian distribution is performed as the two-dimensional moving average process.

11. The debris determination method according to claim 10, wherein in the step I, a relationship between an area ratio of the debris in the hard laser mark-printed region and quality defects caused by debris in a device manufacturing process is obtained in advance, and a threshold (presence of debris) of an area ratio of debris at which the quality defects caused by debris occur is set in advance, and when the area ratio of debris from the low-pass matrix data is at or above the threshold (presence of debris), it is determined that debris is present.

12. The debris determination method according to claim 11, wherein in the step F, the matrix value representing the dots that constitute the hard laser mark is set to 30 or more, and the matrix value representing the noise is set to 10 or less, and in the step I, the predetermined threshold is set to 10.

13. The debris determination method according to claim 10, wherein in the step F, the matrix value representing the dots that constitute the hard laser mark is set to 30 or more, and the matrix value representing the noise is set to 10 or less, and in the step I, the predetermined threshold is set to 10.

14. The debris determination method according to claim 1, wherein in the step I, a relationship between an area ratio of the debris in the hard laser mark-printed region and quality defects caused by debris in a device manufacturing process is obtained in advance, and a threshold (presence of debris) of an area ratio of debris at which the quality defects caused by debris occur is set in advance, and when the area ratio of debris from the low-pass matrix data is at or above the threshold (presence of debris), it is determined that debris is present.

15. The debris determination method according to claim 14, wherein in the step F, the matrix value representing the dots that constitute the hard laser mark is set to 30 or more, and the matrix value representing the noise is set to 10 or less, and in the step I, the predetermined threshold is set to 10.

16. The debris determination method according to claim 1, wherein in the step F, the matrix value representing the dots that constitute the hard laser mark is set to 30 or more, and the matrix value representing the noise is set to 10 or less, and in the step I, the predetermined threshold is set to 10.

17. A wafer having a hard laser mark on a backside thereof, comprising the hard laser mark-printed region that is determined to be free of the debris by the debris determination method according to claim 1.

\* \* \* \* \*